(12) United States Patent
Kiyomihara et al.

(10) Patent No.: US 11,312,227 B2
(45) Date of Patent: Apr. 26, 2022

(54) COOLING SYSTEM FOR ELECTRIC DRIVE VEHICLE

(71) Applicant: Mazda Motor Corporation, Hiroshima (JP)

(72) Inventors: Tatsunori Kiyomihara, Aki-gun (JP); Hirosato Izumi, Aki-gun (JP); Naoki Nagano, Aki-gun (JP); Hirotaka Kitaoka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/989,523

(22) Filed: Aug. 10, 2020

(65) Prior Publication Data

US 2021/0053436 A1 Feb. 25, 2021

(30) Foreign Application Priority Data

Aug. 21, 2019 (JP) .............................. JP2019-151311

(51) Int. Cl.
*B60K 11/00* (2006.01)
*B60K 1/00* (2006.01)

(52) U.S. Cl.
CPC ........ *B60K 11/00* (2013.01); *B60K 2001/003* (2013.01)

(58) Field of Classification Search
CPC ........ B60K 2001/003; B60K 2001/005; B60K 2001/006; B60K 11/02; B60L 58/26
See application file for complete search history.

(56) References Cited

U.S. PATENT DOCUMENTS

| 6,668,764 | B1* | 12/2003 | Henderson | F01P 7/167 123/41.1 |
|---|---|---|---|---|
| 2004/0069546 | A1* | 4/2004 | Lou | F01P 7/026 180/65.21 |
| 2011/0100307 | A1* | 5/2011 | Moffat | F01P 7/165 123/41.1 |
| 2013/0166119 | A1* | 6/2013 | Kummer | B60L 58/26 701/22 |
| 2014/0070013 | A1* | 3/2014 | Stanek | B60H 1/04 237/28 |
| 2014/0266038 | A1* | 9/2014 | Gibeau | B60L 3/0046 320/109 |

(Continued)

FOREIGN PATENT DOCUMENTS

JP 2006067735 A 3/2006

*Primary Examiner* — Jeffrey J Restifo
(74) *Attorney, Agent, or Firm* — Alleman Hall Creasman & Tuttle LLP

(57) ABSTRACT

To suppress cooling performance from being degraded by bubbles in a coolant in a cooling system for an electric drive vehicle, the cooling system includes: a first coolant circuit through which the coolant for cooling an electric motor and electrical equipment circulates; a first pump that is connected to the first coolant circuit and feeds the coolant; and a first degas tank that is connected to the first coolant circuit and separates the bubbles from the coolant. The first coolant circuit connects the electric motor, the electrical equipment, the first pump, and the first degas tank in series. The first pump and the electric motor are connected in a manner to be sequentially aligned in the first coolant circuit. The coolant flows from the first pump to the electric motor.

17 Claims, 6 Drawing Sheets

(56) References Cited

U.S. PATENT DOCUMENTS

| | | | | |
|---|---|---|---|---|
| 2014/0277869 | A1* | 9/2014 | King | B60L 1/00 |
| | | | | 701/22 |
| 2015/0298538 | A1* | 10/2015 | Janarthanam | F01P 3/18 |
| | | | | 165/145 |
| 2015/0333379 | A1* | 11/2015 | Janarthanam | H01M 10/48 |
| | | | | 429/61 |
| 2016/0138878 | A1* | 5/2016 | Gopal | F01P 7/165 |
| | | | | 165/103 |
| 2016/0186648 | A1* | 6/2016 | Rollinger | F01P 11/18 |
| | | | | 123/41.15 |
| 2016/0332520 | A1* | 11/2016 | Miller | B60L 50/16 |
| 2017/0361698 | A1* | 12/2017 | Hussain | F01P 1/06 |
| 2018/0050605 | A1* | 2/2018 | Lewis | B60K 11/02 |
| 2019/0118613 | A1* | 4/2019 | Ragazzi | B60H 1/00392 |
| 2019/0338696 | A1* | 11/2019 | Guenter | B60K 11/06 |
| 2019/0376869 | A1* | 12/2019 | Dudar | G01M 3/007 |
| 2020/0254844 | A1* | 8/2020 | Lopez Hernandez | F25B 43/00 |
| 2020/0398636 | A1* | 12/2020 | He | B60H 1/3208 |
| 2021/0040911 | A1* | 2/2021 | Rejeti | F01P 11/14 |
| 2021/0053436 | A1* | 2/2021 | Kiyomihara | B60K 11/02 |
| 2021/0057964 | A1* | 2/2021 | Kiyomihara | H02K 11/046 |
| 2021/0184294 | A1* | 6/2021 | MacKenzie | B60L 50/64 |

* cited by examiner

COOLING SYSTEM FOR ELECTRIC DRIVE VEHICLE

TECHNICAL FIELD

A technique disclosed herein relates to a cooling system for an electric drive vehicle.

BACKGROUND ART

A cooling system for an electrically driven vehicle is disclosed in Patent Document 1. The cooling system cools a motor, a generator, and electrical equipment with a coolant.

The cooling system includes a coolant circuit, a pump, a radiator, and a reservoir tank. The coolant circuit connects the motor, the generator, and the electrical equipment. The pump feeds the coolant. The radiator releases heat of the coolant. The reservoir tank stores the coolant. The coolant circulates in the coolant circuit. Bubbles in the circulating coolant are delivered into the reservoir tank. In the reservoir tank, the bubbles are separated from the coolant. The reservoir tank is a degas tank.

PRIOR ART DOCUMENTS

Patent Documents

Patent Document 1: JP 2006-67735A

SUMMARY OF THE INVENTION

Problem to be Solved by the Invention

The coolant circuit in the cooling system includes: a first circuit that connects the pump, the electrical equipment, the motor, the generator, the radiator, and the reservoir tank; and a second circuit that connects the pump, the electrical equipment, the motor, and the reservoir tank. The first circuit and the second circuit are arranged in parallel.

When the coolant contains the bubbles, coolant flow resistance in the coolant circuit is increased. The first circuit and the second circuit are arranged in parallel. Thus, in the case where the bubbles are present in the first circuit, for example, a flow of the coolant containing the bubbles is hindered in the first circuit while the coolant not containing the bubbles flows smoothly in the second circuit. In the first circuit where the bubbles are present, the bubbles are unlikely to be delivered into the reservoir tank. As a result, the bubbles remain in the first circuit, and cooling performance remains low in the first circuit where the bubbles are present.

In addition, when the bubbles are unlikely to be delivered into the reservoir tank, the pump may possibly suction the bubbles. Efficiency of the pump that has suctioned the bubbles is reduced. In order to suppress the efficiency of the pump from being reduced, in the cooling system disclosed in Patent Document 1, the pump is arranged at a position immediately downstream of the reservoir tank. Since the reservoir tank separates the coolant and the bubbles, the coolant that flows from the reservoir tank to the pump does not contain the bubbles. As a result, the pump is suppressed from suctioning the bubbles. However, such a restriction is imposed on the cooling system disclosed in Patent Document 1 that the pump has to be arranged at the position immediately downstream of the reservoir tank.

A technique disclosed herein suppresses degradation of cooling performance caused by bubbles in a coolant in a cooling system for an electric drive vehicle.

Means for Solving the Problem

A technique disclosed herein relates to a cooling system for an electric drive vehicle. The cooling system includes:
an electric motor that is disposed in a motor chamber and drives the vehicle;
electrical equipment that is connected to an electric circuit including the electric motor;
a first coolant circuit that is connected to the electric motor and the electrical equipment and through which a first coolant for cooling the electric motor and the electrical equipment circulates;
a first pump that is connected to the first coolant circuit and feeds the first coolant; and
a first degas tank that is connected to the first coolant circuit and separates bubbles from the first coolant.

The coolant circuit connects the electric motor, the electrical equipment, the first pump, and the first degas tank in series,
the first pump and the electric motor are connected in a manner to be sequentially aligned in the first coolant circuit, and
the first coolant flows from the pump to the electric motor.

The first coolant circuit connects the electric motor, the electrical equipment, the first pump, and the first degas tank in series. When the pump is operated, the first coolant forcibly flows through the first coolant circuit. Even when the first coolant contains the bubbles, the bubbles are likely to be delivered into the first degas tank. Since the first degas tank separates the first coolant and the bubbles, the bubbles are unlikely to remain in the first coolant circuit. Cooling performance of the cooling system is suppressed from being degraded by the bubbles.

The bubbles in the first coolant circuit are primarily bubbles that are mixed during manufacturing of the cooling system. In addition, the bubbles are possibly produced in the first coolant during travel of the vehicle.

As described above, the bubbles are unlikely to remain in the first coolant circuit. There is no need to arrange the first pump at a position immediately downstream of the first degas tank in order to suppress suctioning of the bubbles. In this cooling system, freedom of arrangement of the first pump is high. Regardless of the position where the first pump is arranged in the first coolant circuit, pump efficiency is not degraded. The first pump can stably feed the first coolant. Since the pump efficiency is high, the cooling performance of the cooling system is high.

In the cooling system with the above configuration, the first pump and the electric motor are connected in the manner to be sequentially aligned. The first pump can be arranged near the electric motor. Since the first pump is arranged near the electric motor as a heavy object, vibration acceleration that is applied to the first pump during the travel of the vehicle is reduced. Reliability of the first pump is improved.

The first coolant circuit may connect the first degas tank, the electrical equipment, the first pump, the electric motor, and the first degas tank in this order, and
the first coolant may sequentially flow through the first degas tank, the electrical equipment, the first pump, the electric motor, and the first degas tank.

A heat generation amount of the electrical equipment is smaller than that of the electric motor. Since the first coolant flows from the electrical equipment to the electric motor, the cooling system can efficiently cool each of the devices. As a result, the cooling performance of the cooling system is improved.

In addition, in the first coolant circuit, the first coolant that does not contain the bubbles can sequentially flow through the electrical equipment, the first pump, and the electric motor from the first degas tank. The cooling system efficiently cools the electrical equipment and the electric motor. The cooling performance of the cooling system is suppressed from being degraded.

The cooling system may further include a radiator that releases heat of the first coolant, the first coolant circuit may connect the electric motor, the radiator, and the first degas tank in this order, and the first coolant may sequentially flow through the electric motor, the radiator, and the first degas tank.

The first coolant circuit connects the electric motor, the electrical equipment, the first pump, the first degas tank, and the radiator in series. Due to the series connection, the bubbles are unlikely to be present in the first coolant circuit. The cooling performance of the cooling system is suppressed from being degraded.

The heat generation amount of the electric motor is large. The radiator is arranged at a position downstream of the electric motor. The radiator releases heat of the first coolant that has received the heat from the electric motor. A temperature of the first coolant is thereby reduced. The cooling performance of the cooling system is improved.

The electrical equipment may include: a DC/DC converter that changes a voltage of a DC current; and an inverter that outputs an AC current to the electric motor, the DC/DC converter and the inverter may be connected in a manner to be sequentially aligned in the first coolant circuit, and the first coolant may flow from the DC/DC converter to the inverter.

A heat generation amount of the DC/DC converter is smaller than that of the inverter. Since the first coolant flows from the DC/DC converter to the inverter, the cooling system can efficiently cool each of the devices. The cooling performance of the cooling system is improved.

The electrical equipment may include a charger that charges a battery, the first coolant circuit may connect the DC/DC converter, the inverter, and the charger in series in this order, and the first coolant may sequentially flow through the DC/DC converter, the inverter, and the charger.

Since the first coolant sequentially flows through the DC/DC converter, the inverter, and the charger, the cooling system can efficiently cool each of the devices.

The DC/DC converter and the inverter may be disposed in the motor chamber, and the charger may be disposed outside the motor chamber.

The charger is preferably disposed near a socket for a charging plug. The charger is disposed at an appropriate position outside the motor chamber. Since the DC/DC converter and the inverter are disposed in the motor chamber, the electric motor, the DC/DC converter, and the inverter can be arranged to be compact.

The motor chamber may be provided in a front portion of the vehicle. In this case, the charger may be provided in a rear portion of the vehicle. The motor chamber may be provided in the rear portion of the vehicle. In this case, the charger may be provided in the front portion of the vehicle.

The cooling system may include: a generator; and a converter that converts the AC current generated by the generator into the DC current, the first coolant circuit may connect the electrical equipment, the converter, and the generator in this order, and the first coolant may sequentially flow through the electrical equipment, the converter, and the generator.

The heat generation amount of the electrical equipment is smaller than that of the converter. The heat generation amount of the converter is smaller than that of the generator. Since the first coolant sequentially flows through the electrical equipment, the converter, and the electric motor, the cooling system can efficiently cool each of the devices. The cooling performance of the cooling system is improved.

The cooling system further includes:

an engine that is mounted on the vehicle;

a second coolant circuit that is connected to the engine and through which a second coolant for cooling the engine circulates;

a second pump that is connected to the second coolant circuit and feeds the second coolant; and a second degas tank that is connected to the second coolant circuit and separates the bubbles from the second coolant, the second coolant circuit may connect the second degas tank, the second pump, the engine, and the second degas tank in series in this order, and the second coolant may sequentially flow through the second degas tank, the second pump, the engine, and the second degas tank.

The engine may be an engine for driving the generator. Alternatively, the engine may be an engine for the travel of the vehicle.

Allowable temperatures of the engine and the electric motor differ from each other. Since the second coolant circuit is independent of the first coolant circuit, the second coolant circuit can appropriately cool the engine, and the first coolant circuit can appropriately cool the electric motor.

The second coolant circuit connects the second degas tank, the second pump, the engine, and the second degas tank in series. Even when the second coolant contains the bubbles, the bubbles are likely to be delivered into the second degas tank. Since the second degas tank separates the second coolant and the bubbles, the bubbles are unlikely to be present in the second coolant circuit. Cooling performance for the engine is suppressed from being degraded.

Similar to the first coolant circuit, the bubbles are unlikely to be present in the second coolant circuit. Thus, freedom of arrangement of the second pump is high. Regardless of the position where the second pump is arranged in the second coolant circuit, the pump efficiency is not degraded. Since the pump efficiency is high, the cooling performance for the engine by the second coolant circuit is high.

An oil cooler that cools a lubricant for the engine may be provided, the engine and the oil cooler may be connected in a manner to be sequentially aligned in the second coolant circuit, and the second coolant may sequentially flow through the second degas tank, the second pump, the engine, and the oil cooler.

In a cold period of the engine, a temperature of the lubricant is also low. Since the second coolant flows from the engine to the oil cooler, in the cold period of the engine, the oil cooler can warm the lubricant by using heat of the engine. By promptly increasing the temperature of the lubricants, fuel efficiency of the engine is improved.

The pump and the degas tank may be disposed in the motor chamber.

Since the electric motor, the pump, and the degas tank are located close to each other, a total pipe length of the first coolant circuit is short. Thus, coolant flow resistance in the first coolant circuit is low. The first pump can be downsized. In addition, weight of the first coolant circuit is reduced. Vehicle weight is reduced, which is advantageous for extension of a travel di stance of the electric drive vehicle.

The first degas tank may be disposed at an upper stage in a vertical direction, the first pump and the electric motor may be disposed at a lower stage that is lower than the upper stage, and the electrical equipment may be disposed at a position that is above the first pump and the electric motor and is as high as the first degas tank or lower than the first degas tank.

Since the first degas tank is disposed at the upper stage, the bubbles in the first coolant are likely to be collected in the first degas tank. Thus, the bubbles are unlikely to remain in the first coolant circuit.

The first coolant sequentially flows from the first degas tank to the electrical equipment, the first pump, and the electric motor. The first coolant flows from the first degas tank, which is disposed at the upper stage, to the first pump and the electric motor, which are disposed at the lower stage, via the electrical equipment. That is, the first coolant sequentially flows downward from above. A pipe in the first coolant circuit is not provided with or is unlikely to be provided with a folded portion in the vertical direction. Thus, the bubbles are suppressed from being accumulated in the folded portion. As a result, the cooling performance of the cooling system is unlikely to be degraded.

The first pump is disposed at the lower stage together with the electric motor. The vibration acceleration that is applied to the first pump during the travel of the vehicle is reduced. The reliability of the first pump is improved.

The inverter may be disposed below the DC/DC converter.

The first coolant flows from the DC/DC converter located above to the inverter located below. The pipe in the first coolant circuit is not provided with or is unlikely to be provided with the folded portion in the vertical direction. Thus, the bubbles are suppressed from being accumulated in the folded portion.

The generator may be joined to the engine, the engine and the generator may be disposed at the lower stage, and the DC/DC converter and the converter may be aligned above the first pump, the electric motor, the engine, and the generator and in a horizontal direction.

The first coolant flows from the converter located above to the generator located below. The pipe in the first coolant circuit is not provided with or is unlikely to be provided with the folded portion in the vertical direction. Thus, the bubbles are suppressed from being accumulated in the folded portion.

In addition, the first pump, the electric motor, the engine, and the generator are arranged at the lower stage, and the DC/DC converter and the converter are aligned above those devices and in the horizontal direction. Since the devices are arranged at the positions close to each other, a total length of the first coolant circuit is short. This is advantageous for downsizing of the first pump and a reduction in the weight of the first coolant circuit.

Advantage of the Invention

As it has been described so far, according to the cooling system for the electric drive vehicle, it is possible to suppress the cooling performance from being degraded by the bubbles in the coolant.

MODES FOR CARRYING OUT THE INVENTION

A description will hereinafter be made on an embodiment of a cooling system for an electric drive vehicle with reference to the drawings. The cooling system described herein is merely illustrative.

(Configurations of Power Unit and Cooling System)

Figure 1:
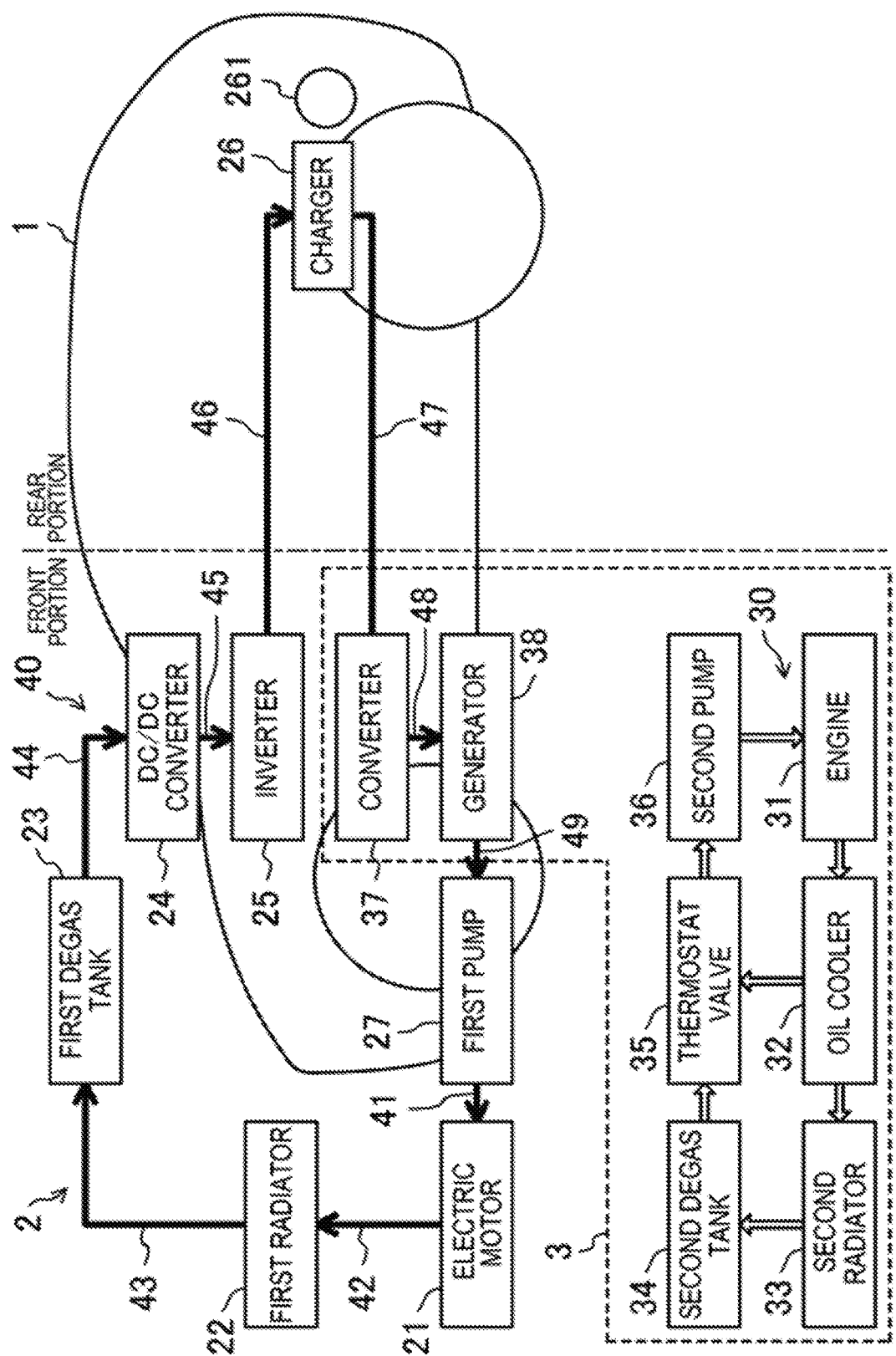
FIG. 1 is a block diagram exemplifying a configuration of a cooling system for an electric drive vehicle.
Figure 2:
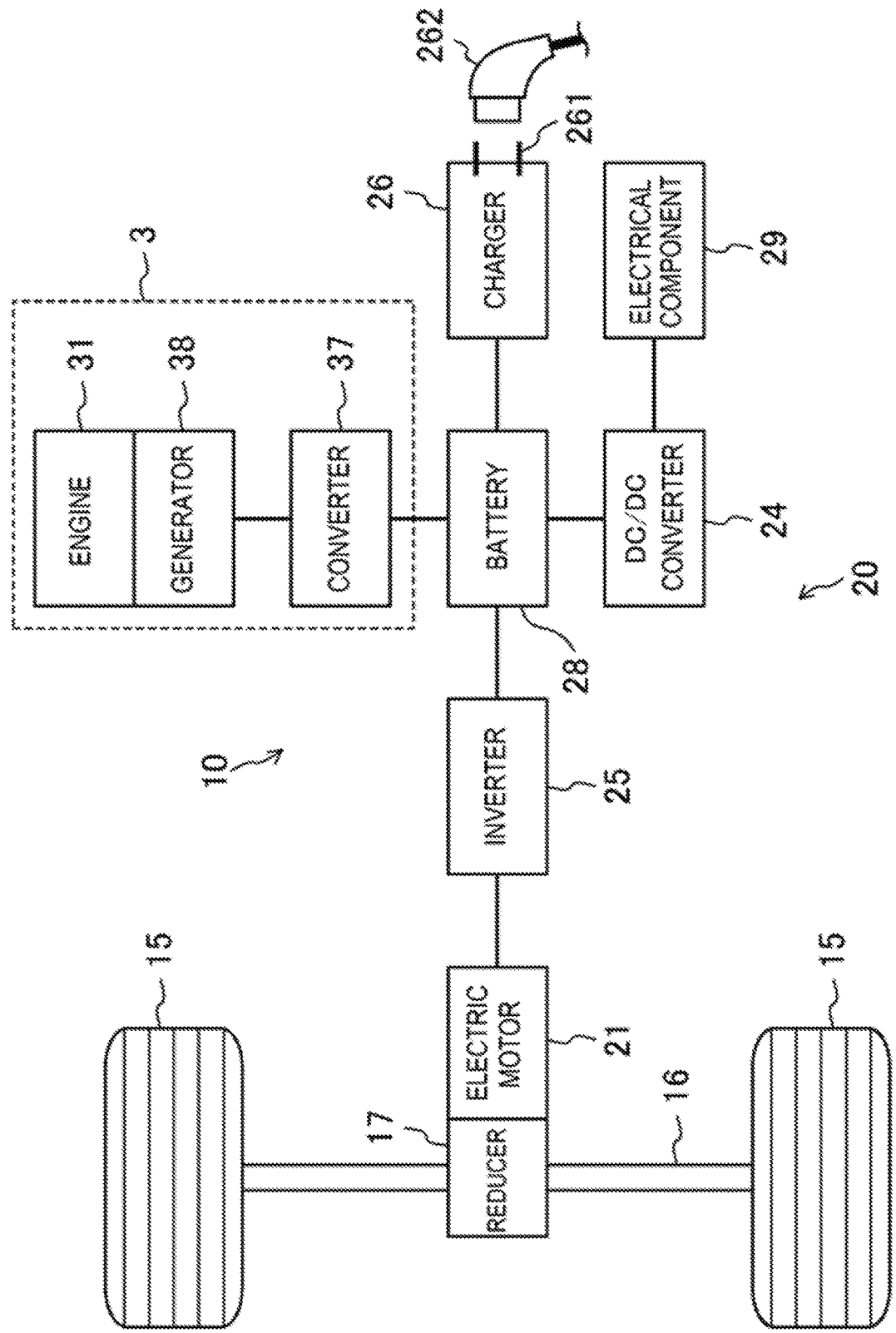
FIG. 2 is a block diagram exemplifying a configuration of an electric circuit in the electric drive vehicle.

FIG. 1 is a block diagram exemplifying a configuration of a cooling system 2 for the electric drive vehicle. FIG. 2 is a block diagram exemplifying configurations of a power unit 10 and an electric circuit 20 in the electric drive vehicle. A vehicle 1 is a so-called electric vehicle (EV). The power unit 10 has an electric motor 21, an inverter 25, and a battery 28. A range extender unit 3, which will be described later, is provided in the power unit 10. The electric circuit 20 includes the electric motor 21, the inverter 25, and the battery 28.

The electric motor 21 is a motor for driving the vehicle 1. The electric motor 21 is connected to right and left drive wheels 15 via a reducer 17 and an axle 16.

The inverter 25 is connected to the electric motor 21. The inverter 25 supplies an AC current to the electric motor 21. The electric motor 21 receives the AC current from the inverter 25 and is thereby operated. The inverter 25 is an example of the electrical equipment.

The inverter 25 is also connected to the battery 28. The inverter 25 converts a DC current from the battery 28 into the AC current.

A charger 26 is connected to the battery 28. The charger 26 has a socket 261. A charging plug 262 is inserted in the socket 261. The charger 26 receives the current from an external power supply of the vehicle 1 and thereby charges the battery 28. The charger 26 is an example of electrical equipment.

A DC/DC converter 24 is also connected to the battery 28. The DC/DC converter 24 changes a voltage of the DC current from the battery 28. The DC/DC converter 24 supplies the DC current, the voltage of which is reduced, to various electrical components 29 mounted on the vehicle 1. The DC/DC converter 24 is an example of the electrical equipment.

The vehicle 1 is a so-called range extender EV. A generator 38 and an engine 31 are mounted on the vehicle 1. The engine 31 and the generator 38 are joined to each other. The engine 31 is an engine for generating electricity. The generator 38 receives power from the engine 31 to generate the electricity.

A converter 37 is connected to the generator 38. The converter 37 converts the AC current generated by the generator 38 into the DC current. The converter 37 is connected to the battery 28. The converter 37 charges the battery 28 with the current generated by the generator 38.

The engine 31, the generator 38, and the converter 37 constitute the integrated range extender unit 3. The vehicle 1 on which the range extender unit 3 is not mounted is a so-called battery EV (BEV).

As illustrated in FIG. 1, the cooling system 2 cools the electric motor 21, the electrical equipment, the converter 37, and the generator 38. The electrical equipment includes the DC/DC converter 24, the inverter 25, and the charger 26 described above. Although not illustrated, each of the electric motor 21, the DC/DC converter 24, the inverter 25, the charger 26, the converter 37, and the generator 38 has a coolant inlet, a coolant outlet, and a passage through which the coolant flows.

The cooling system 2 has a first coolant circuit 40. The electric motor 21, the DC/DC converter 24, the inverter 25, the charger 26, the converter 37, and the generator 38 are connected to the first coolant circuit 40. The first coolant circuit 40 is a closed circuit. A first coolant circulates through the first coolant circuit 40.

The cooling system 2 also has a first pump 27, a first radiator 22, and a first degas tank 23. The first pump 27 feeds the first coolant. The first radiator 22 releases heat of the first coolant. The first degas tank 23 separates bubbles from the first coolant. The bubbles in the first coolant are primarily bubbles that are mixed during manufacturing of the cooling system 2. In addition, the bubbles are possibly produced in the coolant during travel of the vehicle 1.

The first pump 27 is an electric pump. In the first coolant circuit 40, the first pump 27 is interposed between the generator 38 and the electric motor 21. A first pipe 41 connects an outlet 27b of the first pump 27 and a coolant inlet 21a of the electric motor 21. A ninth pipe 49 connects a coolant outlet 38b of the generator 38 and an inlet 27a of the first pump 27 (also see FIG. 4).

The first radiator 22 and the first degas tank 23 are interposed between the electric motor 21 and the DC/DC converter 24 in the first coolant circuit 40. A second pipe 42 connects a coolant outlet 21b of the electric motor 21 and an inlet 22a of the first radiator 22. A third pipe 43 connects an outlet 22b of the first radiator 22 and an inlet 23a of the first degas tank 23. A fourth pipe 44 connects an outlet 23b of the first degas tank 23 and a coolant inlet 24a of the DC/DC converter 24 (also see FIG. 4 and FIG. 6).

A fifth pipe 45 connects a coolant outlet 24b of the DC/DC converter 24 and a coolant inlet 25a of the inverter 25. A sixth pipe 46 connects a coolant outlet 25b of the inverter 25 and a coolant inlet 26a of the charger 26. A seventh pipe 47 connects a coolant outlet 26b of the charger 26 and a coolant inlet 37a of the converter 37. An eighth pipe 48 connects a coolant outlet 37b of the converter 37 and a coolant inlet 38a of the generator 38 (also see FIG. 4, FIG. 5, and FIG. 6).

The first coolant circuit 40 connects the devices in series. The first coolant sequentially flows from the first degas tank 23 to the DC/DC converter 24, the inverter 25, the charger 26, the converter 37, the generator 38, the first pump 27, the electric motor 21, the first radiator 22, and the first degas tank 23.

Here, the charger 26 is disposed in a rear portion of the vehicle 1. The socket 261 is provided to a lateral surface in the rear portion of the vehicle 1. The charger 26 is preferably disposed near the socket 261. The charger 26 is disposed outside a motor chamber 11. In this way, the socket 261 for the charging plug 262 can be provided at an appropriate position in the vehicle 1. The devices other than the charger 26 are disposed in the motor chamber 11. In this way, the power unit 10 can be made compact.

The cooling system 2 also cools the engine 31. As illustrated in FIG. 1, the cooling system 2 has a second coolant circuit 30 that is independent of the first coolant circuit 40. The engine 31 and an oil cooler 32 are connected to the second coolant circuit 30. Allowable temperatures of the engine 31 and the electric motor 21 differ from each other. Since the first coolant circuit 40 and the second coolant circuit 30 are independent of each other, the first coolant circuit 40 can appropriately cool the electric motor 21 and the other devices, and the second coolant circuit 30 can appropriately cool the engine 31.

A second pump 36, a second radiator 33, a second degas tank 34, and a thermostat valve 35 are connected to the second coolant circuit 30. The second pump 36 feeds a second coolant. The engine 31 drives the second pump 36. The second radiator 33 releases heat of the second coolant. The second degas tank 34 separates bubbles from the second coolant. The thermostat valve 35 is an on-off valve that is opened/closed according to a temperature of the second coolant. When the temperature of the second coolant is low, the thermostat valve 35 is opened to let the second coolant bypass the second radiator 33. When the temperature of the second coolant is high, the thermostat valve 35 is closed to let the second coolant flow through the second radiator 33.

The second coolant circuit 30 connects the devices in series. The second coolant sequentially flows from the second degas tank 34 to the thermostat valve 35, the second pump 36, the engine 31, the oil cooler 32, the second radiator 33, and the second degas tank 34. In addition, the engine 31, the oil cooler 32, the second radiator 33, the second degas tank 34, the thermostat valve 35, and the second pump 36 are disposed in the motor chamber 11. These devices are arranged to be compact with each other. A total pipe length of the second coolant circuit 30 is short. Thus, coolant flow resistance in the coolant circuit is low. The second pump 36 can be downsized. In addition, weight of the second coolant circuit 30 is reduced. As a result, vehicle weight is reduced, which is advantageous for extension of a travel distance of the electric drive vehicle.

As surrounded by broken lines in FIG. 1, the range extender unit 3 includes the engine 31, the oil cooler 32, the second radiator 33, the second degas tank 34, the thermostat valve 35, the second pump 36, the converter 37, and the generator 38.

Although not illustrated, the configuration of a cooling system in the BEV, on which the range extender unit 3 is not mounted, differs from that of the cooling system 2 in FIG. 1. More specifically, the first coolant circuit 40 connects the coolant outlet 26b of the charger 26 and the inlet 27a of the first pump 27.

(Layouts of Power Unit and Cooling System)

Figure 3:
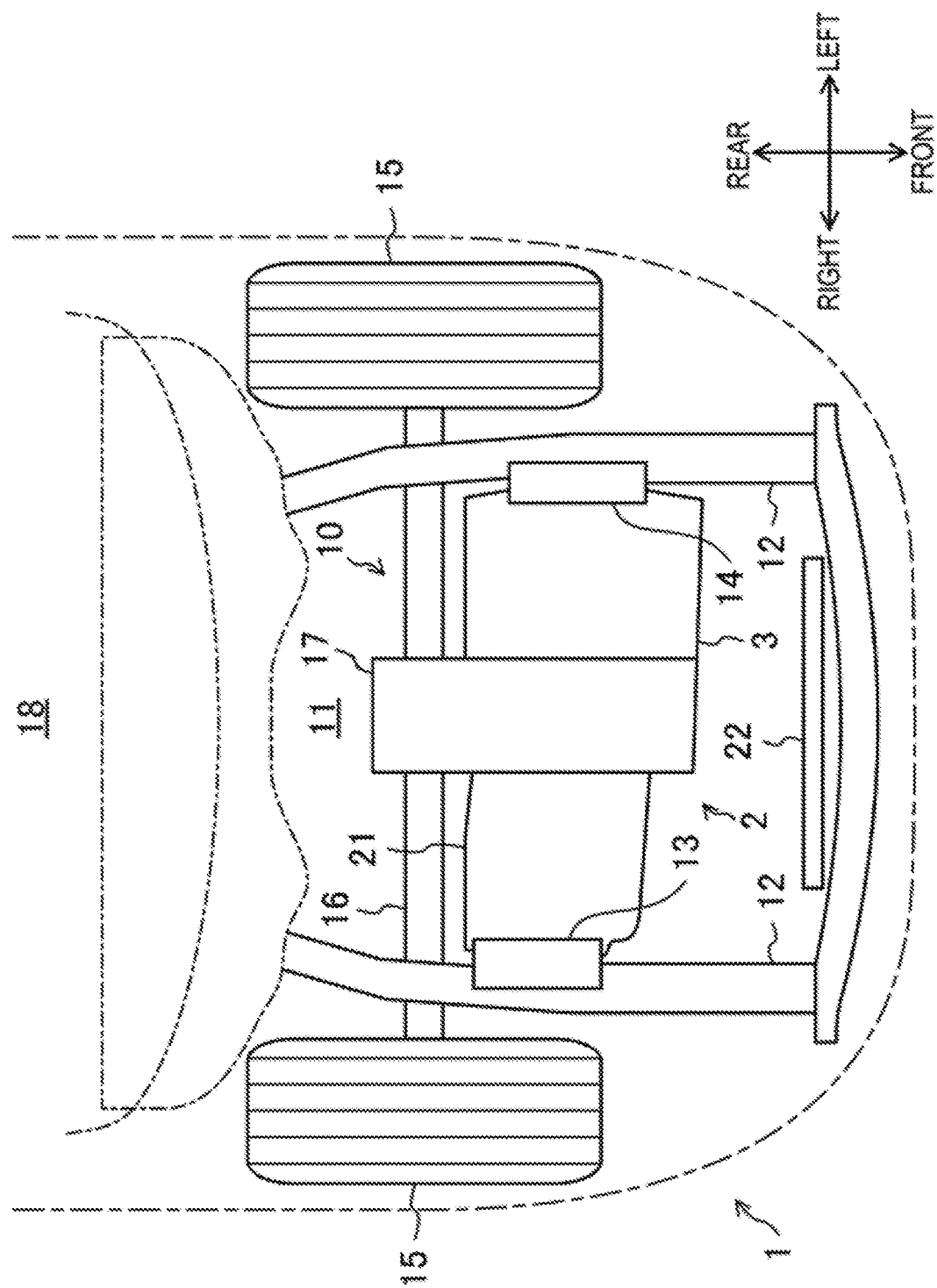
FIG. 3 is a plan view of a power unit and the cooling system that are disposed in a motor chamber.
Figure 4:
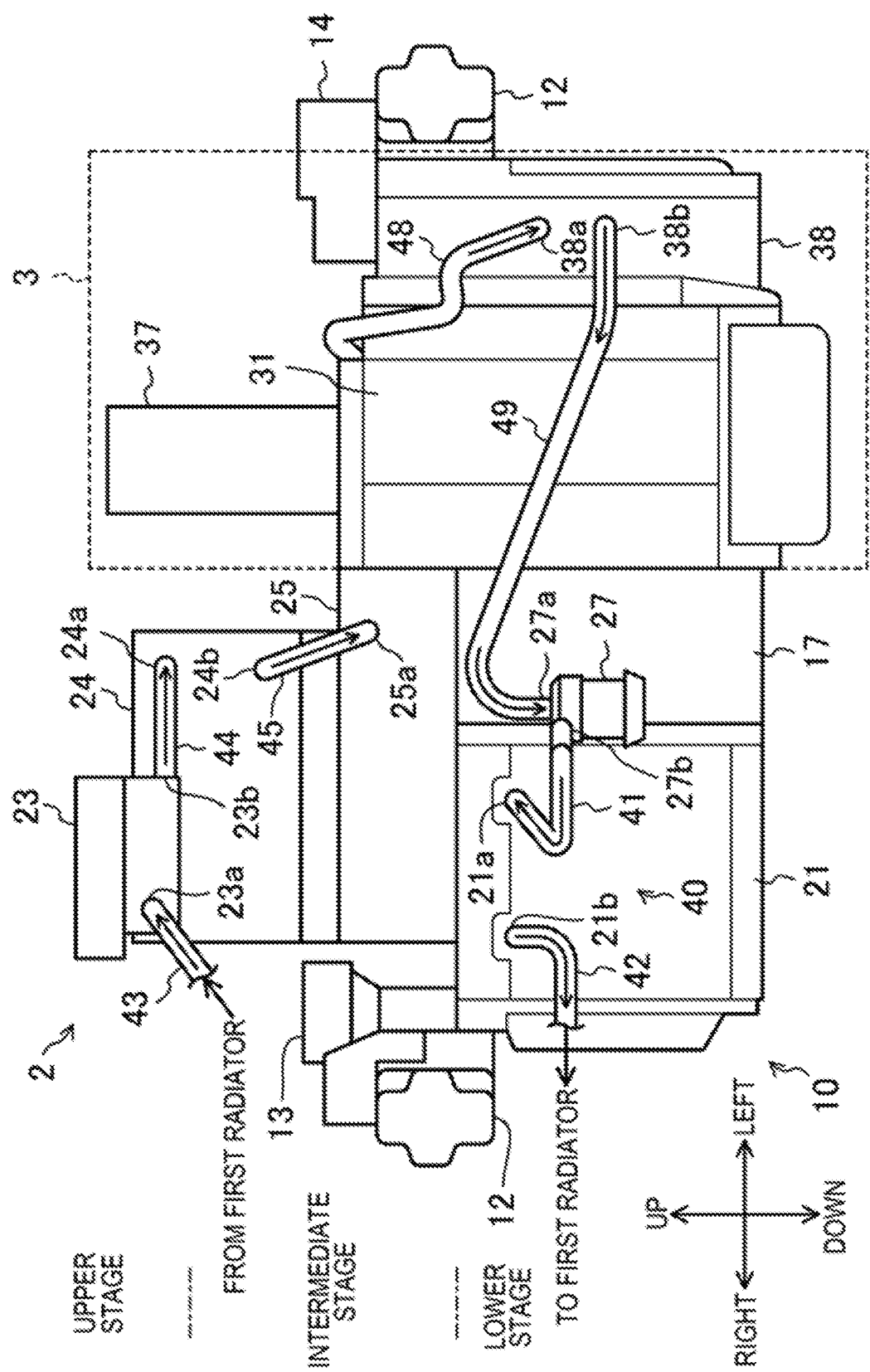
FIG. 4 is a front view in which the power unit and the cooling system disposed in the motor chamber are seen from the front.
Figure 5:
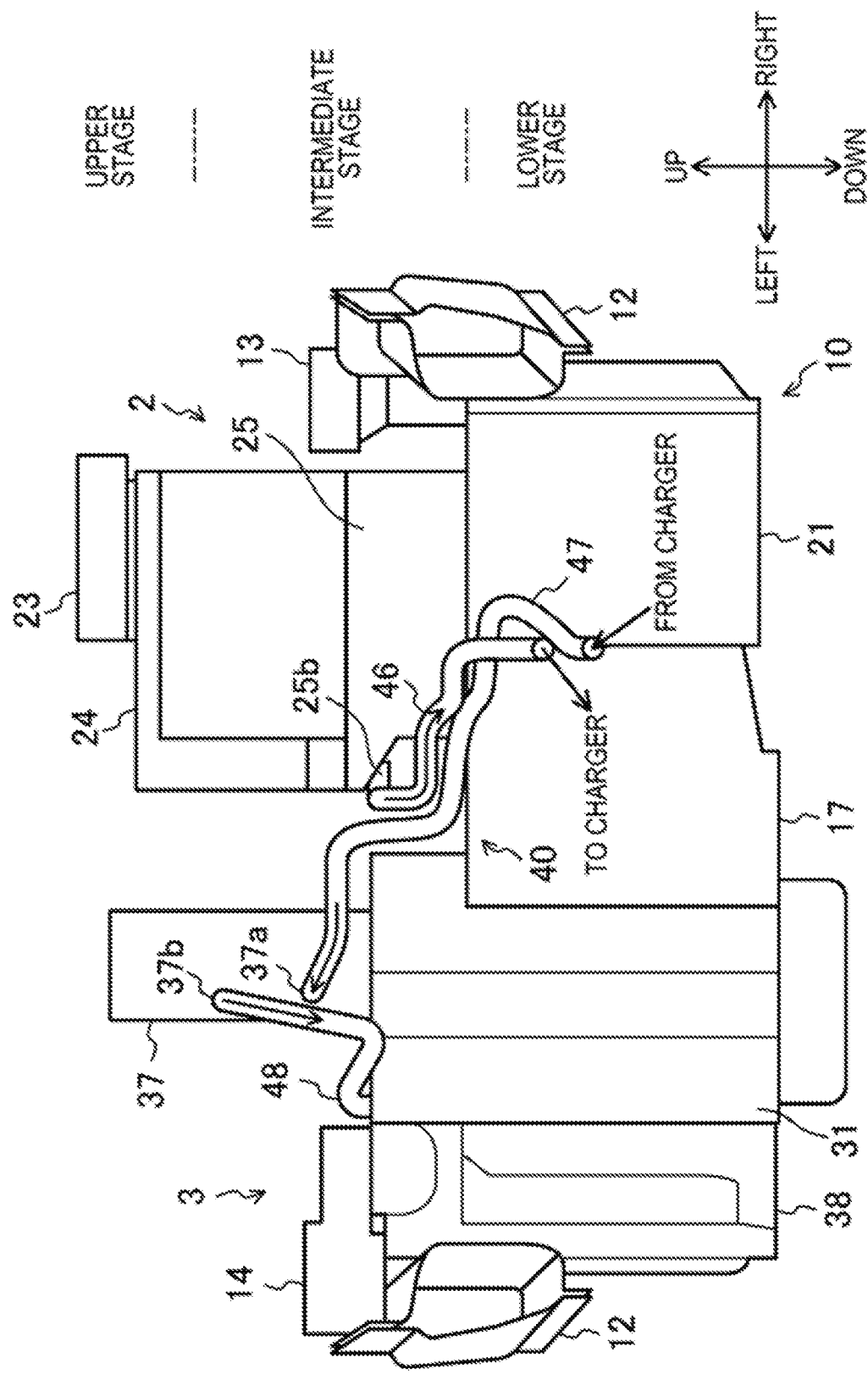
FIG. 5 is a back view in which the power unit and the cooling system disposed in the motor chamber are seen from behind.
Figure 6:
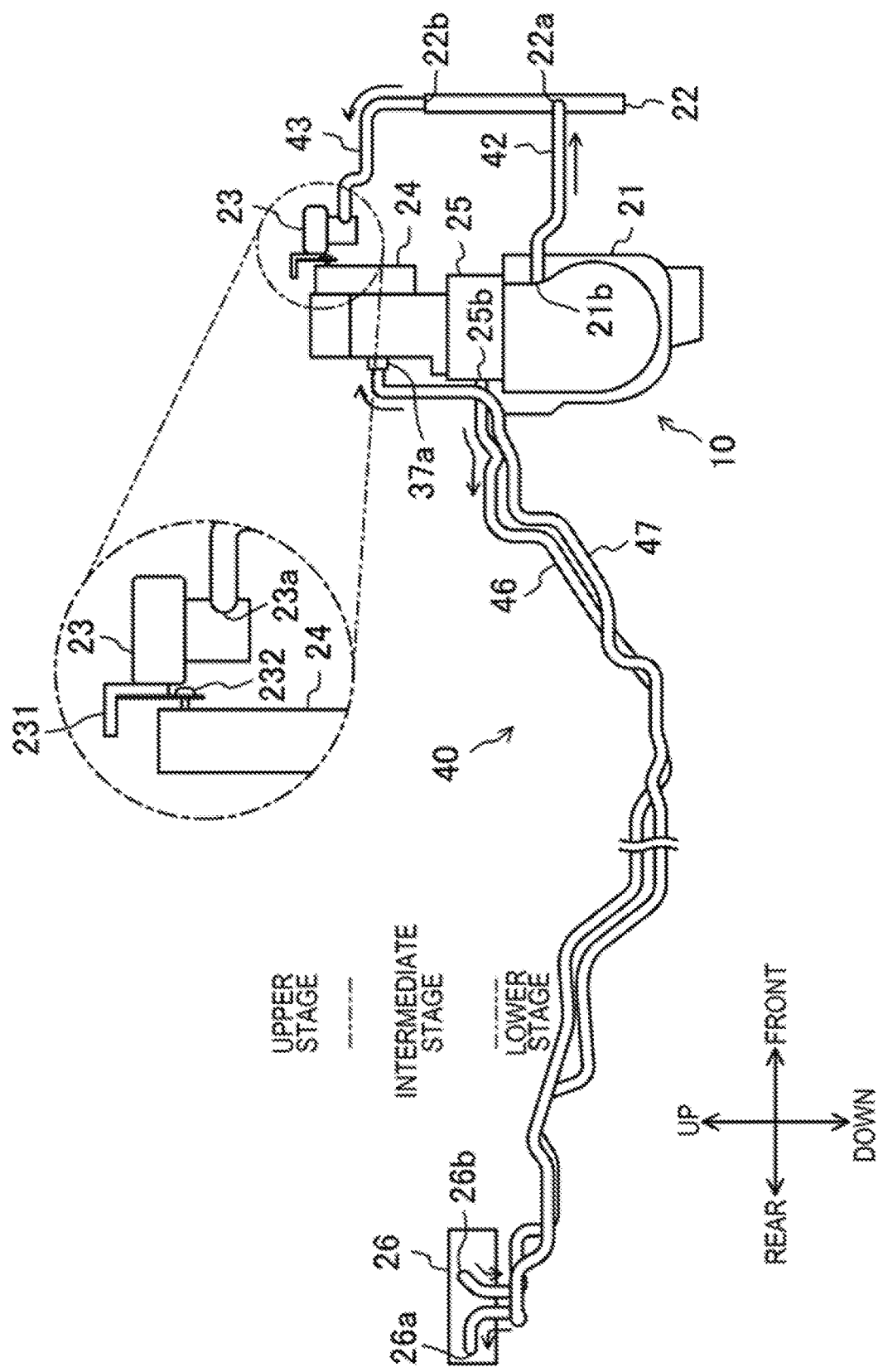
FIG. 6 is a side view of the power unit and the cooling system disposed in the motor chamber and a charger disposed in a rear portion of the vehicle.

Next, a description will be made on layouts of the power unit 10 that is configured as described above and of the cooling system 2 with reference to FIGS. 3 to 6. FIG. 3 is a plan view of the power unit 10 and the cooling system 2 that are disposed in the motor chamber 11. FIG. 4 is a front view in which the power unit 10 and the cooling system 2 disposed in the motor chamber 11 are seen from the front. FIG. 5 is a back view in which the power unit 10 and the cooling system 2 disposed in the motor chamber 11 are seen from behind. FIG. 6 is a side view of the power unit 10 and the cooling system 2 disposed in the motor chamber 11 and the charger 26 disposed in the rear portion of the vehicle. In FIGS. 3 to 6, only the first coolant circuit 40 of the cooling system 2 is illustrated, and the second coolant circuit 30 is not illustrated. Arrows in FIGS. 4 to 6 each indicate a flow direction of the coolant.

In the following description, a vehicle length direction of the vehicle 1 will be referred to as a longitudinal direction, the front of the vehicle 1 and the rear of the vehicle 1 will be referred to as "front" and "rear", respectively. A direction that is orthogonal to the vehicle length direction of the vehicle 1 will be referred to as a vehicle width direction. The right with a passenger who is seated in a cabin 18 (see FIG. 3) of the vehicle 1 being a reference will be referred to as "right", and the left with the passenger being the reference will be referred to as "left".

As described above, the power unit 10 is disposed in the motor chamber 11. The motor chamber 11 is provided in front of the cabin 18. Frames 12 are disposed in the motor chamber 11. The two frames 12 are disposed with a clearance being provided therebetween in the vehicle width direction, that is, in a right-left direction of the sheet of FIG. 3. Each of the frames 12 extends in the longitudinal direction of the vehicle 1, that is, an up-down direction of the sheet of FIG. 3.

As illustrated in FIG. 3, the power unit 10 includes the electric motor 21, the reducer 17, and the range extender unit 3. As described above, the range extender unit 3 includes the engine 31 and the generator 38. The electric motor 21 is arranged on a right side in the motor chamber 11, and the range extender unit 3 is arranged on a left side in the motor chamber 11. As illustrated in FIG. 4 and FIG. 5, the electric motor 21, the reducer 17, the engine 31, and the generator 38 are aligned in the vehicle width direction. The electric motor 21, the reducer 17, the engine 31, and the generator 38 are integrated. The power unit 10 is relatively long in the vehicle width direction.

The power unit 10 is disposed between the frame 12 and the frame 12. A right end of the power unit 10 is supported by the frame 12 on the right side via a mount 13. A left end of the power unit 10 is supported by the frame 12 on the left side via a mount 14. As illustrated in FIG. 4 and FIG. 5, the mounts 13, 14 that are fixed to the frames 12 each hang the power unit 10.

The first radiator 22 is disposed in front of the power unit 10. The first radiator 22 is located in a front end portion of the motor chamber 11.

As illustrated in FIG. 4 and FIG. 5, the first degas tank 23 is disposed at an upper stage in the motor chamber 11. In other words, a height position at which the first degas tank 23 is disposed will be referred to as the "upper stage".

The third pipe 43 is connected to a front portion of a lower portion of the first degas tank 23. In addition, the fourth pipe 44 is connected to a lateral portion of the lower portion of the first degas tank. A height of the inlet 23a of the first degas tank 23 is the same or substantially the same as a height of the outlet 23b thereof. The inlet 23a and the outlet 23b of the first degas tank 23 are located at the upper stage.

The DC/DC converter 24 is disposed behind the first degas tank 23. As illustrated in FIG. 6, the first degas tank 23 is interposed between the first radiator 22 and the DC/DC converter 24 in the longitudinal direction.

As enlarged in FIG. 6, the first degas tank 23 is fixed to the DC/DC converter 24 by a bracket 231 and a bolt 232. A part of the first degas tank 23 opposes the DC/DC converter 24 in the longitudinal direction.

The DC/DC converter 24 has a box shape that expands in the vertical direction and the vehicle width direction. The DC/DC converter 24 is disposed at a height from the upper stage to an intermediate stage. The intermediate stage means a position that is lower than the upper stage and is higher than a lower stage, which will be described later. That is, the DC/DC converter 24 is disposed at a position as high as the first degas tank 23 or lower than the first degas tank 23.

The fourth pipe 44 is connected to an upper left portion of a front portion of the DC/DC converter 24. A height of the inlet 24a of the DC/DC converter 24 is the same or substantially the same as the height of the outlet 23b of the first degas tank 23. The fourth pipe 44 extends in a horizontal direction. The fifth pipe 45 is connected to a lower left portion of the front portion of the DC/DC converter 24. A height of the outlet 24b of the DC/DC converter 24 is lower than a height of the inlet 24a thereof.

The inverter 25 is disposed at the intermediate stage. In detail, the inverter 25 is disposed above the electric motor 21 and the reducer 17 and below the DC/DC converter 24. The inverter 25 has a box shape that expands in the vehicle width direction and the longitudinal direction.

The fifth pipe 45 is connected to an upper left portion of a front portion of the inverter 25. A height of the inlet 25a of the inverter 25 is lower than the height of the outlet 24b of the DC/DC converter 24. The fifth pipe 45 extends obliquely downward. The sixth pipe 46 is connected to a left portion of the inverter 25. The height of the inlet 25a of the inverter 25 is the same or substantially the same as a height of the outlet 25b thereof. The inlet 25a and the outlet 25b of the inverter 25 are located at the intermediate stage.

As illustrated in FIG. 6, the charger 26 is disposed in the rear portion of the vehicle 1. The charger 26 is disposed at the intermediate stage. The sixth pipe 46 runs from the motor chamber 11 through a portion under a floor of the vehicle 1 and extends to the rear portion of the vehicle 1. The sixth pipe 46 is once lowered as extending rearward from a front portion, is then raised again, and reaches the charger 26. The charger 26 has a box shape that expands in the vehicle width direction and the longitudinal direction. The sixth pipe 46 is connected to a lateral portion of the charger 26.

The seventh pipe 47 is connected to the lateral portion of the charger 26. A height of the inlet 26a of the charger 26 is the same or substantially the same as a height of the outlet 26b thereof. The inlet 26a and the outlet 26b of the charger 26 are located at the intermediate stage.

Similar to the sixth pipe 46, the seventh pipe 47 also runs from the rear portion of the vehicle through the portion under the floor of the vehicle 1 and extends to the motor chamber 11 in the front portion of the vehicle 1. The seventh pipe 47 is once lowered as extending forward from the rear portion of the vehicle 1, is then raised again, and reaches the motor chamber 11.

The converter 37 is disposed at a position from the upper stage to the intermediate stage. The converter 37 is located on the engine 31. The converter 37 and the DC/DC converter 24 are aligned in the horizontal direction, in detail, the vehicle width direction. The converter 37 has a box shape that extends in the vertical direction. As illustrated in FIG. 5, the seventh pipe 47 is connected to a lower portion of a rear portion of the converter 37.

The eighth pipe 48 is connected to an intermediate portion of the rear portion of the converter 37. A height of the coolant outlet 37b of the converter 37 is higher than a height of the inlet 37a thereof. Both of the coolant inlet 37a and outlet 37b of the converter 37 are located at the intermediate stage. The eighth pipe 48 extends from a rear side to a front side of the power unit 10.

The generator 38 is located at a left end of the power unit 10. The engine 31 is disposed to the immediate right of the generator 38. The generator 38 and the engine 31 are disposed from the intermediate stage to the lower stage. The eighth pipe 48 is connected to an intermediate portion of a front portion of the generator 38. A height of the coolant inlet 38a of the generator 38 is lower than the height of the outlet 37b of the converter 37.

The ninth pipe 49 is connected to the intermediate portion of the front portion of the generator 38. The height of the coolant outlet 38b of the generator 38 is lower than the height of the inlet 38a thereof.

The first pump 27 is disposed at the lower stage. The first pump 27 is located in front of the electric motor 21 and the reducer 17. The ninth pipe 49 is connected to an upper portion of the first pump 27. A height of the inlet 27a of the first pump 27 is higher than the height of the outlet 38b of the generator 38. The height of the inlet 27a of the first pump 27 is the same or substantially the same as the height of the outlet 27b thereof. The inlet 27a and the outlet 27b of the first pump 27 are located at the lower stage.

The electric motor 21 is disposed at a right end of the power unit 10. The electric motor 21 is disposed at the lower stage. In other words, a height position at which the electric motor 21 is disposed will be referred to as the "lower stage". The electric motor 21 and the reducer 17 are aligned in the horizontal direction, that is, the vehicle width direction. As described above, the inverter 25 is disposed on the electric motor 21 and the reducer 17.

The first pipe 41 connects the outlet 27b of the first pump 27 and the coolant inlet 21a of the electric motor 21. The inlet 21a is located on an upper left side in a front portion of the electric motor 21. A height of the coolant inlet 21a of the electric motor 21 is higher than the height of the outlet 27b of the first pump 27. The coolant outlet 21b of the electric motor 21 is located on an upper right side in the front portion of the electric motor 21. A height of the outlet 21b is the same or substantially the same as the height of the inlet 21a. The inlet 21a and the outlet 21b are located at the lower stage.

The second pipe 42 is connected to the outlet 21b. As illustrated in FIG. 6, the second pipe 42 extends forward. The second pipe 42 is connected to the coolant inlet 22a of the first radiator 22. The inlet 22a is provided to a lateral portion of the first radiator 22. The height of the inlet 22a is lower than the height of the coolant outlet 21b of the electric motor 21. The inlet 22a is located at the lower stage.

The third pipe 43 is connected to the outlet 22b of the first radiator 22. The outlet 22b is provided in an upper end portion of the first radiator 22. The third pipe 43 extends obliquely upward to the rear. As described above, the third pipe 43 is connected to the inlet 23a of the first degas tank 23. The height of the inlet 23a is higher than a height of the outlet 22b of the first radiator 22.

As illustrated in FIG. 1, the first coolant circuit 40 connects the electric motor 21, the first radiator 22, the first degas tank 23, the DC/DC converter 24, the inverter 25, the charger 26, the converter 37, the generator 38, and the first pump 27 in series. When the first pump 27 is operated, the first coolant forcibly flows through the first coolant circuit 40. Even when the first coolant contains the bubbles, the bubbles are likely to be delivered into the first degas tank 23. Since the first degas tank 23 separates the first coolant and the bubbles, the bubbles are unlikely to remain in the first coolant circuit 40. In regard to cooling of the electric motor 21 and the electrical equipment, cooling performance of the cooling system 2 is suppressed from being degraded by the bubbles.

The bubbles are unlikely to remain in the first coolant circuit 40 with the series configuration. Thus, there is no need to arrange the first pump 27 at a position immediately downstream of the first degas tank 23 in order to suppress suctioning of the bubbles. In this cooling system 2, freedom of arrangement of the first pump 27 is high. Regardless of the position where the first pump 27 is arranged in the first coolant circuit 40, pump efficiency is not degraded. The first pump 27 can stably feed the first coolant. Since the pump efficiency is high, the cooling performance of the cooling system 2 is high.

Note that also in the BEV that does not have the range extender unit 3, similar to what have been described above, the bubbles are unlikely to remain in the first coolant circuit 40. In regard to cooling of the electric motor 21 and the electrical equipment, the cooling performance of the cooling system 2 is suppressed from being degraded by the bubbles. In addition, the first pump 27 is unlikely to suction the bubbles, and the pump efficiency thereof is high. Thus, the cooling performance of the cooling system 2 is high.

The second coolant circuit 30 also connects the engine 31, the oil cooler 32, the second radiator 33, the second degas tank 34, the thermostat valve 35, and the second pump 36 in series. Even when the second coolant contains the bubbles, the bubbles are likely to be delivered into the second degas tank 34. Since the second degas tank 34 separates the second coolant and the bubbles, the bubbles are unlikely to remain in the second coolant circuit 30. Also, in regard to cooling of the engine 31, the cooling performance of the cooling system 2 is suppressed from being degraded by the bubbles.

Since the bubbles are also unlikely to remain in the second coolant circuit 30, freedom of arrangement of the second pump 36 is high. Regardless of the position where the second pump 36 is arranged in the second coolant circuit 30, pump efficiency is not degraded. Since the pump efficiency is high, the cooling performance for the engine 31 by the second coolant circuit 30 is high.

The first coolant, the heat of which is released by the first radiator 22, and from which the bubbles are separated in the first degas tank 23, sequentially flows through the DC/DC converter 24, the inverter 25, the charger 26, the converter 37, the generator 38, and the electric motor 21. A heat generation amount of the DC/DC converter 24 is smaller than that of the inverter 25. The heat generation amount of the inverter 25 is smaller than that of the converter 37. The heat generation amount of the converter 37 is smaller than that of the generator 38. The heat generation amount of the generator 38 is smaller than that of the electric motor 21. Since the first coolant flows through the devices in an ascending order of the heat generation amount, the cooling system 2 can efficiently cool each of the devices.

Since the first coolant that flows through each of the devices does not contain the bubbles, the cooling performance of the cooling system 2 is suppressed from being degraded.

In the first coolant circuit 40, the first radiator 22 is located immediately downstream of the electric motor 21 having the large heat generation amount. Since the first radiator 22 releases the heat of the first coolant that has received the heat from the electric motor 21, a temperature of the first coolant is effectively reduced. The cooling performance of the cooling system 2 is improved.

In the second coolant circuit 30, a temperature of a lubricant is also low in a cold period of the engine 31. In the second coolant circuit 30, the second coolant flows from the engine 31 to the oil cooler 32. In this way, in the cold period of the engine 31, the oil cooler 32 can warm the lubricant by using heat of the engine 31. Fuel efficiency of the engine 31 is improved.

In the first coolant circuit 40, since the first degas tank 23 is arranged at the upper stage, the bubbles in the first coolant are likely to be collected in the first degas tank 23. As a result, the bubbles are unlikely to be present in the first coolant circuit 40.

The DC/DC converter 24 is disposed at the position from the upper stage to the intermediate stage, the inverter 25 and the charger 26 are disposed at the intermediate stage, and the coolant inlet 37a and outlet 37b of the converter 37 are disposed at the intermediate stage. Furthermore, the inlet 38a and the outlet 38b of the generator 38 are disposed at the lower stage, and the first pump 27 and the electric motor 21 are disposed at the lower stage. In this way, the first coolant sequentially flows downward from above. Each of the pipes 41 to 49 that constitute the first coolant circuit 40 is not provided with or is unlikely to be provided with a folded portion in the vertical direction. The bubbles are suppressed from being accumulated in the folded portion. The cooling performance of the cooling system 2 is unlikely to be degraded.

The first degas tank 23, the DC/DC converter 24, the inverter 25, the electric motor 21, the first pump 27, the converter 37, the engine 31, and the generator 38 are aligned in the vertical direction. Furthermore, on the power unit 10, the DC/DC converter 24 and the converter 37 are aligned in the horizontal direction. These devices are arranged to be compact. In addition, since the devices are located close to each other, a total length of the pipes 41 to 49 in the first coolant circuit 40 is short. Thus, coolant flow resistance in the first coolant circuit 40 is low. In the case where the coolant flow resistance of the first coolant circuit 40 is low, the first pump 27 can be downsized. In addition, weight of the first coolant circuit 40 is reduced. As a result, the vehicle weight is reduced, which is advantageous for extension of a travel distance of the vehicle 1.

Since the first pump 27 is arranged at the lower stage together with the electric motor 21, the engine 31, and the generator 38 as heavy objects, vibration acceleration that is applied to the first pump 27 during the travel of the vehicle 1 is reduced. Reliability of the first pump 27 is improved.

As illustrated in FIG. 6, the first degas tank 23 is interposed between the DC/DC converter 24 and the first radiator 22 in the longitudinal direction. Thus, during a vehicle collision, the first degas tank 23 can alleviate a collision load that is applied to the DC/DC converter 24.

The motor chamber may be provided in the rear portion of the vehicle 1. The charger 26 may be provided in the front portion of the vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: Vehicle
10: Power unit
11: Motor chamber
2: Cooling system
20: Electric circuit
21: Electric motor
22: First radiator
23: First degas tank
24: DC/DC converter (electrical equipment)
25: Inverter (electrical equipment)
26: Charger (electrical equipment)
27: First pump
28: Battery
30: Second coolant circuit
31: Engine
32: Oil cooler
34: Second degas tank
36: Second pump
37: Converter
38: Generator
40: First coolant circuit

The invention claimed is:

1. A cooling system for an electric drive vehicle, the cooling system comprising:
an electric motor that is disposed in a motor chamber and drives the vehicle;
electrical equipment that is connected to an electric circuit including the electric motor;
a first coolant circuit that is connected to the electric motor and the electrical equipment and through which a first coolant for cooling the electric motor and the electrical equipment circulates;
a first pump that is connected to the first coolant circuit and feeds the first coolant;
a first degas tank that is connected to the first coolant circuit and separates bubbles from the first coolant, wherein
the first coolant circuit connects the electric motor, the electrical equipment, the first pump, and the first degas tank in series,
the first pump and the electric motor are connected in a manner to be sequentially aligned in the first coolant circuit,
the first coolant flows from the first pump to the electric motor,
the electrical equipment includes:
a DC/DC converter that changes a voltage of a DC current; and
an inverter that outputs an AC current to the electric motor,
the DC/DC converter and the inverter are connected in a manner to be sequentially aligned in the first coolant circuit, and
the first coolant flows from the DC/DC converter to the inverter.

2. The cooling system for the electric drive vehicle according to claim 1, further comprising:
a generator; and
a converter that converts the AC current generated by the generator into the DC current, wherein
the first coolant circuit connects the electrical equipment, the converter, and the generator in this order, and
the first coolant sequentially flows through the electrical equipment, the converter, and the generator.

3. The cooling system for the electric drive vehicle according to claim 2, further comprising:
an engine that is mounted on the vehicle;

a second coolant circuit that is connected to the engine and through which a second coolant for cooling the engine circulates;

a second pump that is connected to the second coolant circuit and feeds the second coolant; and a second degas tank that is connected to the second coolant circuit and separates bubbles from the second coolant, wherein the second coolant circuit connects the second degas tank, the second pump, the engine, and the second degas tank in series in this order, and the second coolant sequentially flows through the second degas tank, the second pump, the engine, and the second degas tank.

4. The cooling system for the electric drive vehicle according to claim 1, wherein the first pump and the first degas tank are disposed in the motor chamber.

5. A cooling system for an electric drive vehicle, the cooling system comprising:

an electric motor that is disposed in a motor chamber and drives the vehicle;

electrical equipment that is connected to an electric circuit including the electric motor;

a first coolant circuit that is connected to the electric motor and the electrical equipment and through which a first coolant for cooling the electric motor and the electrical equipment circulates;

a first pump that is connected to the first coolant circuit and feeds the first coolant;

a first degas tank that is connected to the first coolant circuit and separates bubbles from the first coolant, wherein the first coolant circuit connects the electric motor, the electrical equipment, the first pump, and the first degas tank in series, the first pump and the electric motor are connected in a manner to be sequentially aligned in the first coolant circuit, the first coolant flows from the first pump to the electric motor, the first coolant circuit connects the first degas tank, the electrical equipment, the first pump, the electric motor, and the first degas tank in this order, and the first coolant sequentially flows through the first degas tank, the electrical equipment, the first pump, the electric motor, and the first degas tank in this order.

6. The cooling system for the electric drive vehicle according to claim 5, further comprising:

a radiator that releases heat of the first coolant, wherein the first coolant circuit connects the electric motor, the radiator, and the first degas tank in this order, and the first coolant sequentially flows through the electric motor, the radiator, and the first degas tank.

7. The cooling system for the electric drive vehicle according to claim 6, wherein the electrical equipment includes:

a DC/DC converter that changes a voltage of a DC current; and an inverter that outputs an AC current to the electric motor, the DC/DC converter and the inverter are connected in a manner to be sequentially aligned in the first coolant circuit, and the first coolant flows from the DC/DC converter to the inverter.

8. The cooling system for the electric drive vehicle according to claim 7, wherein the electrical equipment includes a charger that charges a battery, the first coolant circuit connects the DC/DC converter, the inverter, and the charger in series in this order, and the first coolant sequentially flows through the DC/DC converter, the inverter, and the charger.

9. The cooling system for the electric drive vehicle according to claim 8, wherein the DC/DC converter and the inverter are disposed in the motor chamber, and the charger is disposed outside the motor chamber.

10. The cooling system for the electric drive vehicle according to claim 9, further comprising:

a generator; and a converter that converts the AC current generated by the generator into the DC current, wherein the first coolant circuit connects the electrical equipment, the converter, and the generator in this order, and the first coolant sequentially flows through the electrical equipment, the converter, and the generator.

11. The cooling system for the electric drive vehicle according to claim 10, further comprising:

an engine that is mounted on the vehicle;

a second coolant circuit that is connected to the engine and through which a second coolant for cooling the engine circulates;

a second pump that is connected to the second coolant circuit and feeds the second coolant; and a second degas tank that is connected to the second coolant circuit and separates bubbles from the second coolant, wherein the second coolant circuit connects the second degas tank, the second pump, the engine, and the second degas tank in series in this order, and the second coolant sequentially flows through the second degas tank, the second pump, the engine, and the second degas tank.

12. The cooling system for the electric drive vehicle according to claim 11, further comprising:

an oil cooler that cools a lubricant for the engine, wherein the engine and the oil cooler are connected in a manner to be sequentially aligned in the second coolant circuit, and the second coolant sequentially flows through the second degas tank, the second pump, the engine, and the oil cooler.

13. The cooling system for the electric drive vehicle according to claim 12, wherein the first pump and the first degas tank are disposed in the motor chamber.

14. The cooling system for the electric drive vehicle according to claim 13, wherein the first degas tank is disposed at an upper stage in a vertical direction, the first pump and the electric motor are disposed at a lower stage that is lower than the upper stage, and the electrical equipment is disposed at a position that is above the first pump and the electric motor and is as high as the first degas tank or lower than the first degas tank.

15. The cooling system for the electric drive vehicle according to claim 14, wherein the inverter is disposed below the DC/DC converter.

16. The cooling system for the electric drive vehicle according to claim 15, wherein the generator is joined to the engine, the engine and the generator are disposed at the lower stage, and the DC/DC converter and the converter are aligned above the pump, the electric motor, the engine, and the generator and in a horizontal direction.

17. A cooling system for an electric drive vehicle, the cooling system comprising:

an electric motor that is disposed in a motor chamber and drives the vehicle;

electrical equipment that is connected to an electric circuit including the electric motor;

a first coolant circuit that is connected to the electric motor and the electrical equipment and through which a first coolant for cooling the electric motor and the electrical equipment circulates;

a first pump that is connected to the first coolant circuit and feeds the first coolant;

a first degas tank that is connected to the first coolant circuit and separates bubbles from the first coolant;

an engine that is mounted on the vehicle;

a second coolant circuit that is connected to the engine and through which a second coolant for cooling the engine circulates;

a second pump that is connected to the second coolant circuit and feeds the second coolant; and a second degas tank that is connected to the second coolant circuit and separates bubbles from the second coolant, wherein the first coolant circuit connects the electric motor, the electrical equipment, the first pump, and the first degas tank in series, the first pump and the electric motor are connected in a manner to be sequentially aligned in the first coolant circuit, the first coolant flows from the first pump to the electric motor, the second coolant circuit connects the second degas tank, the second pump, the engine, and the second degas tank in series in this order, and the second coolant sequentially flows through the second degas tank, the second pump, the engine, and the second degas tank.

\* \* \* \* \*